United States Patent
Kramer et al.

(10) Patent No.: US 7,443,793 B2
(45) Date of Patent: Oct. 28, 2008

(54) PROCESSOR WITH DYNAMIC TABLE-BASED SCHEDULING USING LINKED TRANSMISSION ELEMENTS FOR HANDLING TRANSMISSION REQUEST COLLISIONS

(75) Inventors: David B. Kramer, Austin, TX (US); David P. Sonnier, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 1292 days.

(21) Appl. No.: 10/085,219

(22) Filed: Feb. 28, 2002

(65) Prior Publication Data

US 2003/0161316 A1 Aug. 28, 2003

(51) Int. Cl.
*H04J 3/14* (2006.01)
(52) U.S. Cl. .................... 370/230.1; 370/412
(58) Field of Classification Search .............. None
See application file for complete search history.

(56) References Cited

U.S. PATENT DOCUMENTS

| | | | |
|---|---|---|---|
| 5,694,554 A | 12/1997 | Kawabata et al. | |
| 5,712,851 A * | 1/1998 | Nguyen et al. | 370/399 |
| 5,889,763 A | 3/1999 | Boland et al. | |
| 6,011,775 A | 1/2000 | Bonomi et al. | |
| 6,011,798 A | 1/2000 | McAlpine | |
| 6,374,405 B1 | 4/2002 | Willard | |
| 6,377,583 B1 * | 4/2002 | Lyles et al. | 370/412 |
| 6,389,019 B1 | 5/2002 | Fan et al. | |
| 6,414,963 B1 | 7/2002 | Gemar | |
| 6,477,144 B1 | 11/2002 | Morris et al. | |
| 6,477,168 B1 * | 11/2002 | Delp et al. | 370/395.4 |
| 6,483,839 B1 * | 11/2002 | Gemar et al. | 370/395.42 |
| 6,526,062 B1 | 2/2003 | Milliken et al. | |
| 6,535,512 B1 | 3/2003 | Daniel et al. | |
| 6,603,766 B1 | 8/2003 | Zifroni et al. | |
| 6,661,774 B1 * | 12/2003 | Lauffenburger et al. | 370/230.1 |
| 6,667,977 B1 | 12/2003 | Ono | |
| 6,721,325 B1 * | 4/2004 | Duckering et al. | 370/395.4 |
| 6,735,207 B1 | 5/2004 | Prasad et al. | |
| 2002/0080721 A1 | 6/2002 | Tobagi et al. | |
| 2002/0122403 A1 | 9/2002 | Hashem et al. | |
| 2002/0142780 A1 | 10/2002 | Airy et al. | |
| 2002/0159411 A1 | 10/2002 | Airy et al. | |
| 2003/0021228 A1 | 1/2003 | Nakano et al. | |
| 2003/0046414 A1 * | 3/2003 | Pettyjohn et al. | 709/230 |
| 2003/0081624 A1 * | 5/2003 | Aggarwal et al. | 370/412 |
| 2005/0050543 A1 | 3/2005 | Ogus et al. | |

* cited by examiner

*Primary Examiner*—Firmin Backer
*Assistant Examiner*—Rhonda Murphy
(74) *Attorney, Agent, or Firm*—Ryan, Mason & Lewis, LLP

(57) ABSTRACT

A processor includes scheduling circuitry for scheduling data blocks for transmission from multiple transmission elements, and traffic shaping circuitry coupled to the scheduling circuitry and operative to establish a traffic shaping requirement for the transmission of the data blocks from the transmission elements. The scheduling circuitry is configured for utilization of at least one time slot table which includes multiple locations, each corresponding to a transmission time slot. The scheduling circuitry is operative in conjunction with the time slot table to schedule the data blocks for transmission in a manner that substantially maintains the traffic shaping requirement established by the traffic shaping circuitry even in the presence of collisions between requests from the transmission elements for each of one or more of the time slots. In an illustrative embodiment, the scheduling circuitry utilizes a transmission element linking mechanism in conjunction with a set of pointers to accommodate multiple transmission elements which request the same time slot.

22 Claims, 5 Drawing Sheets

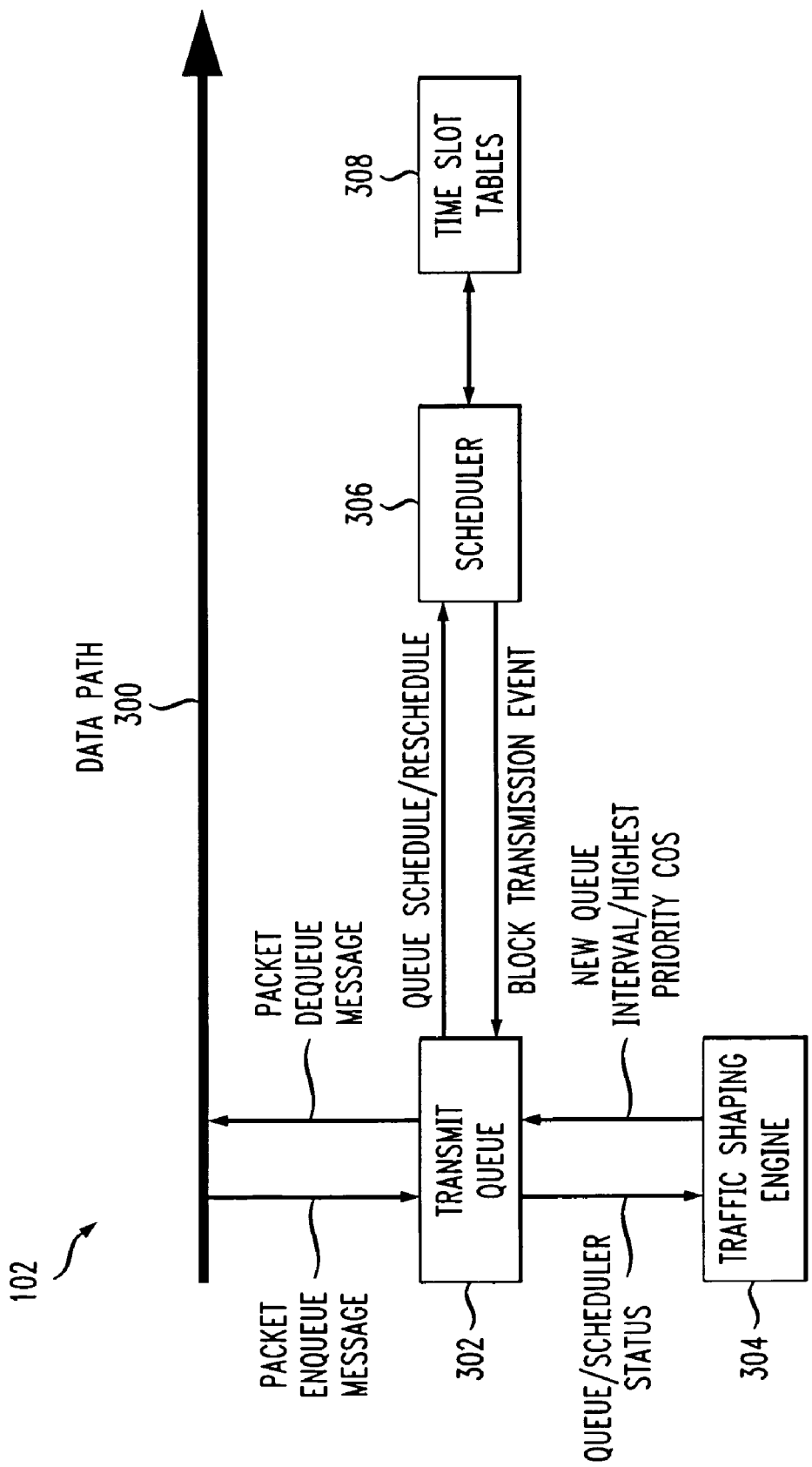

FIG. 4

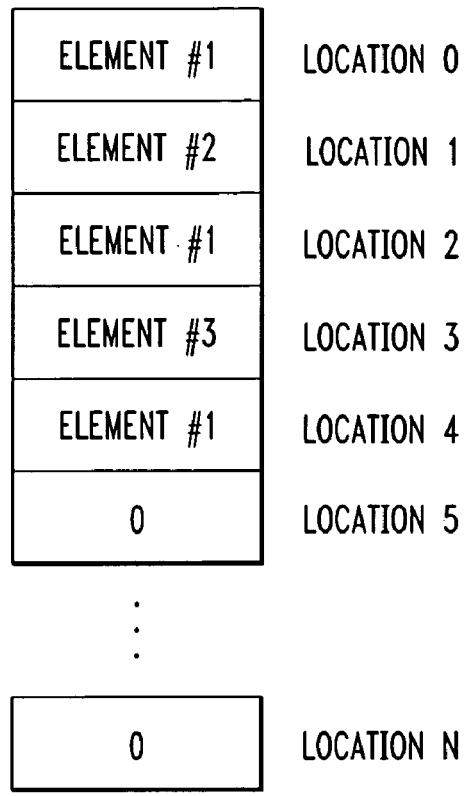

| | |
|---|---|
| ELEMENT #1 | LOCATION 0 |
| ELEMENT #2 | LOCATION 1 |
| ELEMENT #1 | LOCATION 2 |
| ELEMENT #3 | LOCATION 3 |
| ELEMENT #1 | LOCATION 4 |
| 0 | LOCATION 5 |
| ⋮ | |
| 0 | LOCATION N |

FIG. 5

| POINTER | DESCRIPTION |
|---|---|
| CP | CURRENT POINTER – POINTS TO THE NEXT ELEMENT IN THE TABLE TO BE TRANSMITTED |
| AP | ACTUAL POINTER – POINTS TO THE TIME SLOT THAT CORRESPONDS TO ACTUAL TIME |
| FP | FREE POINTER – POINTS TO THE NEXT ENTRY THAT CORRESPONDS TO AN EMPTY SLOT (NO ELEMENT) |

PROCESSOR WITH DYNAMIC TABLE-BASED SCHEDULING USING LINKED TRANSMISSION ELEMENTS FOR HANDLING TRANSMISSION REQUEST COLLISIONS

RELATED APPLICATIONS

The present invention is related to the inventions described in U.S. patent applications Ser. Nos. 10/085,223 entitled "Processor With Dynamic Table Based Scheduling Using Multi-Entry Table Locations For Handling Transmission Request Collisions," 10/085,222 entitled "Processor With Table-Based Scheduling Using Software-Controlled Interval Computation," and 10/085,771 entitled "Processor With Software-Controlled Programmable Service Levels," all filed concurrently herewith and hereby incorporated by reference herein.

FIELD OF THE INVENTION

The present invention relates generally to techniques for transmitting packets or other blocks of data through a network, and more particularly to a network processor or other type of processor configured for use in performing operations such as routing or switching of such data blocks.

BACKGROUND OF THE INVENTION

A network processor generally controls the flow of data between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

An important function of a network processor involves the scheduling of packets or other data blocks for transmission, e.g., for transmission to the switch fabric from the network or vice versa. A network processor typically includes a scheduler for implementing this function. One way that such a scheduler may be implemented involves the use of demand-based time slot tables, also referred to as dynamic time slot tables. In these cases, a significant problem that can arise relates to the manner in which the scheduler deals with transmission request collisions, that is, simultaneous requests for transmission in the same time slot. Typically, only a single block of data can be transmitted in a given time slot. When multiple data blocks request transmission in the same time slot, only one of the blocks can be transmitted, and the other blocks must be delayed or dropped. It should be noted that this problem is specific to demand-based time slot tables, and is generally not an issue for static time slot tables which can be configured to avoid collisions altogether.

The above-noted problem with demand-based time slot tables makes it difficult to maintain a desired traffic shaping for the transmitted data blocks in the corresponding network processor. This in turn complicates the provision of desired service levels, e.g., specified quality of service (QoS) or class of service (CoS) levels, for particular network connections supported by the network processor.

A need therefore exists for improved scheduling techniques for use in a network processor, which are able to accommodate multiple simultaneous collisions in transmission requests without undermining the provision of QoS, CoS or other desired service levels for corresponding network connections.

SUMMARY OF THE INVENTION

The invention provides improved techniques for scheduling data blocks for transmission in a network processor or other type of processor.

In accordance with one aspect of the invention, a processor includes scheduling circuitry for scheduling data blocks for transmission from multiple transmission elements, and traffic shaping circuitry coupled to the scheduling circuitry and operative to establish a traffic shaping requirement for the transmission of the data blocks from the transmission elements. The scheduling circuitry is configured for utilization of at least one time slot table which includes multiple locations, each corresponding to a transmission time slot. The scheduling circuitry is operative in conjunction with the time slot table to schedule the data blocks for transmission in a manner that substantially maintains the traffic shaping requirement established by the traffic shaping circuitry even in the presence of collisions between requests from the transmission elements for each of one or more of the time slots, through the use of a linking of colliding transmission elements. For example, identifiers of transmission elements generating requests that collide for a given time slot may be linked together from a single entry in the corresponding table location and then scheduled for transmission in the order in which they are linked, thereby substantially maintaining the established traffic shaping requirement.

In an illustrative embodiment, the scheduling circuitry utilizes a transmission element linking mechanism in conjunction with a set of pointers to accommodate multiple transmission elements which request the same time slot. More particularly, the identifiers of the transmission elements may comprise a multi-bit structure for allowing a given one of the transmission element identifiers to be linked to another of the transmission element identifiers. In the event of a collision between multiple transmission elements requesting a given one of the time slots, an identifier of a first one of the requesting transmission elements is entered into the corresponding location in the time slot table, and that identifier is linked to an identifier of a second of the requesting transmission elements. Similar linking is provided between the identifier of the second requesting transmission element and an identifier of any subsequent one of the requesting transmission elements, such that a linked list of the multiple requesting elements is created for the corresponding location in the time slot table. Upon transmission of a data block from one of the requesting transmission elements in the linked list of elements, a determination is made as to whether there are any further elements linked to that element, and if there are any further elements, the identifier of the next such element is determined and that identifier is written into the corresponding location in the time slot table. The set of pointers may include a current pointer pointing to the next location in the time slot table for which a data block will be transmitted, an actual pointer pointing to the location in the time slot table corresponding to actual time, and a free pointer pointing to the next location in the time slot table that is a free entry with no requesting transmission element assigned thereto. The pointers are processed by the scheduling circuitry in a manner which ensures that the established traffic shaping requirement is substantially maintained.

Advantageously, the techniques of the invention can accommodate multiple simultaneous collisions of transmission requests, and greatly facilitate the provision of QoS, CoS or other desired service levels for network connections.

BRIEF DESCRIPTION OF THE DRAWINGS

FIG. 3 is a more detailed view of a network processor of the FIG. 1 system configured in accordance with the techniques of the invention.

FIG. 4 shows an illustrative time slot table utilizable in a scheduling operation of the FIG. 3 processor in accordance with the invention.

FIG. 5 shows a set of pointers utilized in a scheduling operation in an illustrative embodiment of the present invention.

DETAILED DESCRIPTION OF THE INVENTION

The invention will be illustrated herein in conjunction with an exemplary system for processing data for transmission through a network. The exemplary system includes a network processor configured in a particular manner in order to illustrate the techniques of the invention. It should be understood, however, that the invention is more generally applicable to any processor in which it is desirable to provide improved table-based scheduling operations.

A "processor" as the term is used herein may be implemented, by way of example and without limitation, utilizing elements such as those commonly associated with a microprocessor, central processing unit (CPU), digital signal processor (DSP), application-specific integrated circuit (ASIC), or other type of data processing device, as well as portions and combinations of such elements.

The present invention in an illustrative embodiment improves scheduling operations in a network processor or other processor through the use of a table-based scheduling technique which allows multiple transmission elements to be assigned to the same transmission time slot, while also maintaining a desired traffic shaping for the transmitted data blocks.

Figure 1:
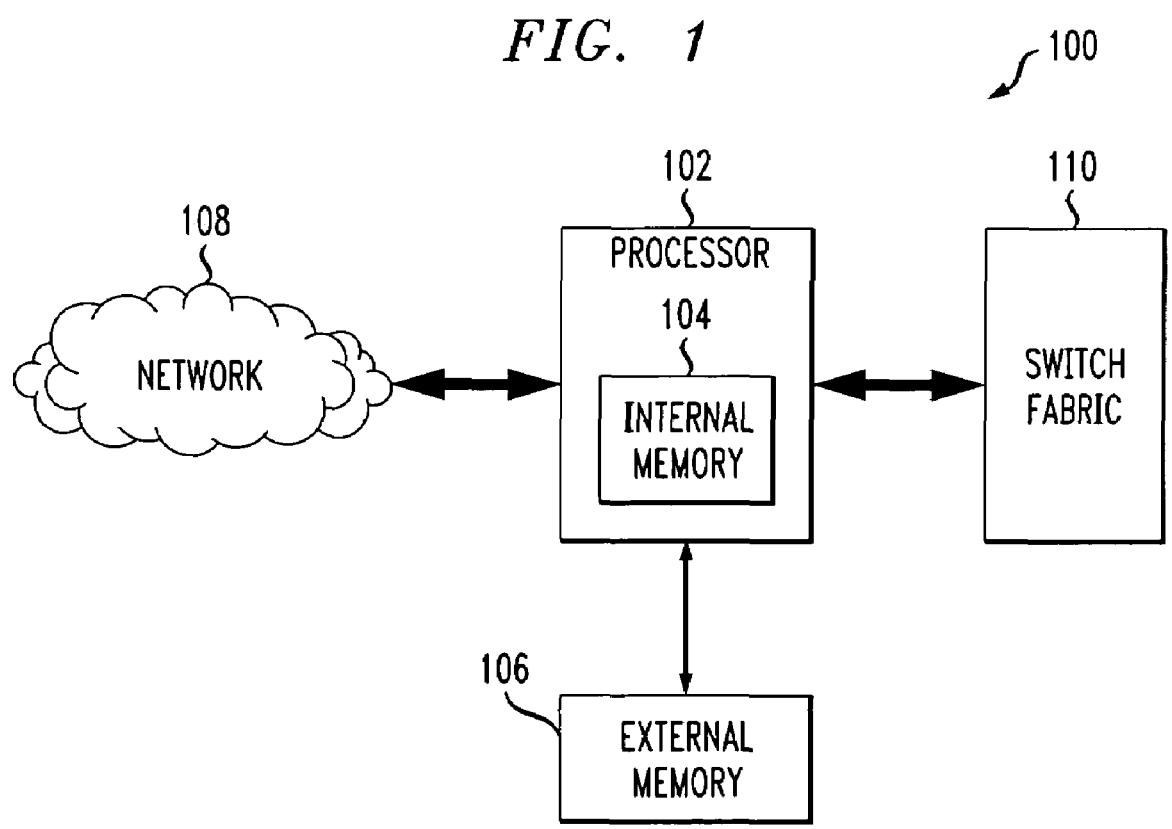
FIG. 1 is a simplified block diagram of an illustrative embodiment of a processing system in which the present invention is implemented.

FIG. 1 shows a network processing system 100 in which the invention is implemented. The system 100 includes a network processor 102 having an internal memory 104. The network processor 102 is coupled to an external memory 106 as shown, and is configured to provide an interface for communicating cells, packets, protocol data units (PDUs) or other arrangements of data between a network 108 and a switch fabric 110. All such arrangements of data are intended to be encompassed by the general term "data block" as used herein. The processor 102 and its associated external memory 106 may be implemented, e.g., as one or more integrated circuits installed on a line card or port card of a router or switch. In such a configuration, the switch fabric 110 is generally considered to be a part of the router or switch.

Figure 2:
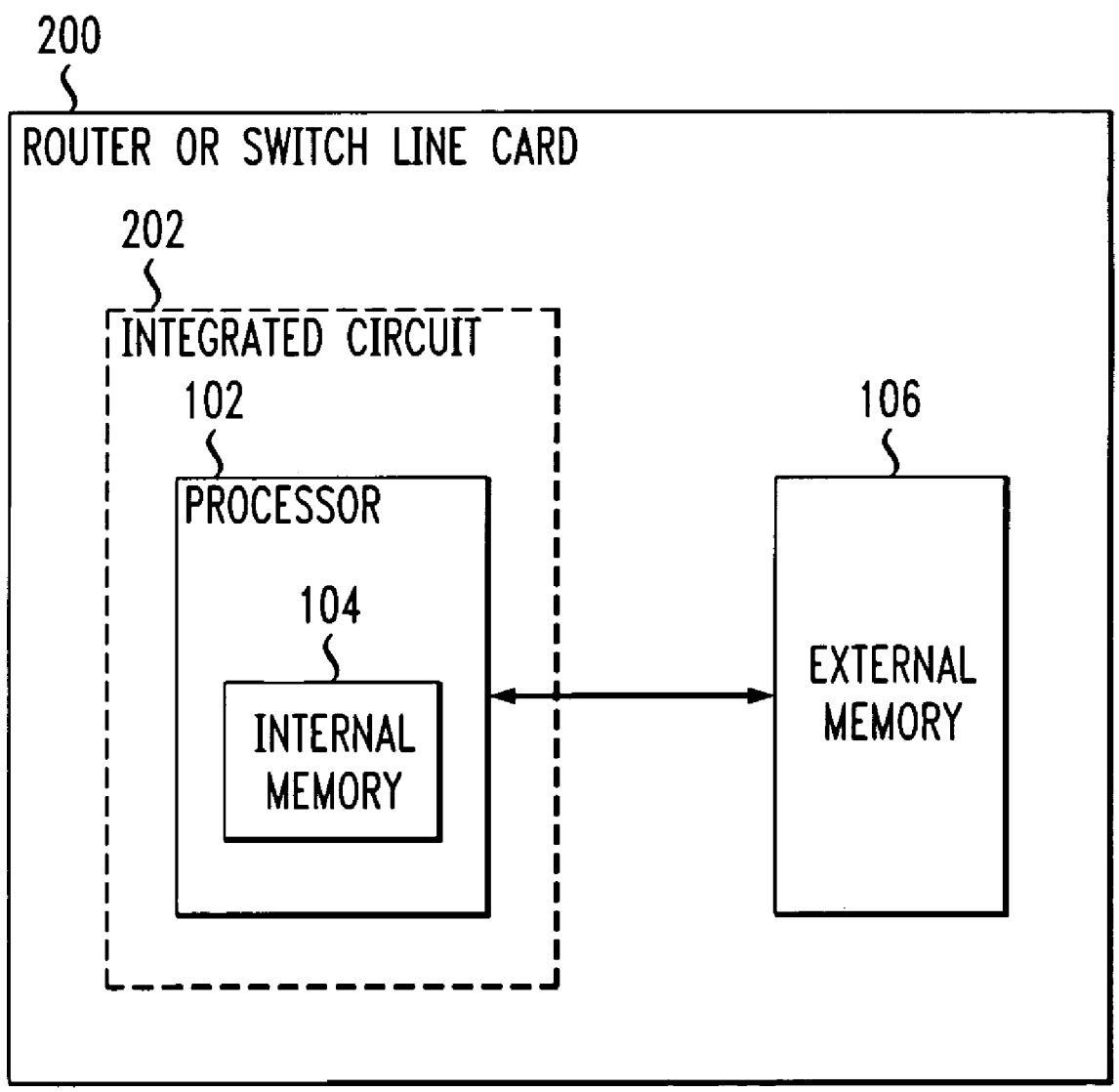
FIG. 2 illustrates one possible implementation of a network processor of the FIG. 1 system as an integrated circuit installed on a line card of a router or switch.

FIG. 2 illustrates an example router or switch line card embodiment of a portion of the system 100 of FIG. 1. In this embodiment, the processing system comprises a line card 200 having at least one integrated circuit 202 installed thereon. The integrated circuit 202 comprises network processor 102 which has internal memory 104. The network processor 102 interacts with external memory 106 on the line card 200. The external memory 106 may serve, e.g., as an external static random access memory (SRAM) or dynamic random access memory (DRAM) for the network processor integrated circuit 202. Such memories may be configured in a conventional manner. A suitable host processor may also be installed on the line card 200, and used for programming and otherwise controlling the operation of one or more network processor integrated circuits on the line card 200.

The portion of the processing system as shown in FIGS. 1 and 2 is considerably simplified for clarity of illustration. It is to be appreciated, however, that the processing system may comprise a router or switch which includes multiple line cards such as that shown in FIG. 2, and that each of the line cards may include multiple integrated circuits. A similar embodiment may be implemented in the form of a port card.

It should also be understood that the particular arrangements of system elements shown in FIGS. 1 and 2 are by way of illustrative example only. More specifically, as previously noted, the invention can be implemented in any type of processor, and is not limited to any particular network-based processing application.

FIG. 3 shows a more detailed view of the network processor 102 in the illustrative embodiment of the invention. The network processor 102 in this embodiment includes a data path 300, a transmit queue 302, a traffic shaping engine 304, a scheduler 306, and a set of time slot tables 308.

The data path 300 may represent one or more processing elements which collectively provide a path for data blocks in passing through the processor 102. Such data path elements may be configured in a conventional manner well understood by those skilled in the art, and are therefore not described in further detail herein.

The transmit queue 302 preferably has a plurality of transmission elements associated therewith. For example, the transmit queue 302 may comprise a plurality of transmission queues and associated control logic, with each of the transmission queues corresponding to a transmission element. It should be noted, however, that the term "transmission element" as used herein is intended to be construed more generally so as to encompass any source of one or more data blocks that are to be scheduled for transmission in the network processor 102.

The transmit queue 302 in this embodiment is coupled to the traffic shaping engine 304 and to the scheduler 306, and provides an interface between these elements and the data path 300. In general, the transmit queue 302 supplies time slot requests from transmission elements associated therewith to the scheduler 306 in accordance with one or more traffic shaping requirements established by the traffic shaping engine 304 for the transmission of the data blocks from the transmission elements of the transmit queue 302.

Packets or other data blocks can be enqueued in transmission elements of the transmit queue 302 from the data path 300, e.g., in conjunction with packet enqueue messages and associated data blocks received from the data path 300. Similarly, packets or other data blocks can be dequeued from the transmission elements to the data path 300 upon transmission, e.g., in conjunction with packet dequeue messages and associated data blocks sent to the data path 300.

The traffic shaping engine 304 is coupled to the scheduler 306 via the transmit queue 302, and establishes the traffic shaping requirements in the illustrative embodiment. As is shown in the figure, the traffic shaping engine 304 receives information regarding queue and scheduler status from the transmit queue 302, and generates traffic shaping information that is returned to the transmit queue 302. This information may include information such as queue transmission interval and prioritization for establishing a class of service (CoS) or other desired service level for one or more of the transmission elements or their corresponding network connections. The term "traffic shaping requirement" as used herein is intended to include without limitation information that at least partially specifies a service level for one or more of the transmission elements or their corresponding network connections, e.g., a desired transmission rate, transmission interval, transmission order or prioritization for one or more of the transmission elements. The traffic shaping engine 304 is an example of an element referred to more generally herein as "traffic shaping circuitry." In other embodiments, traffic shaping circuitry may be configured to include, in addition to the traffic shaping engine 304, one or more elements or functions of the transmit queue 302, or other arrangements of circuitry capable of establishing traffic shaping requirements, as will be readily apparent to those skilled in the art.

The scheduler 306 is responsible for scheduling data blocks for transmission from the queues or other transmission elements of the transmit queue 302. In accordance with the invention, the scheduler 306 utilizes one or more of the time slot tables 308 to schedule the data blocks for transmission in a manner that substantially maintains the traffic shaping requirement established by the traffic shaping engine 304 in the presence of collisions between requests from the transmission elements for each of one or more of the time slots.

As shown in the figure, the scheduler 306 receives transmission requests, e.g., in the form of queue schedule or reschedule commands, from the transmit queue 302, and processes these requests in accordance with information stored in the time slot tables 308 to generate block transmission event commands that are returned to the transmit queue 302.

It should be emphasized that the particular information shown in FIG. 3 as being communicated between the elements 300, 302, 304 and 306 thereof is by way of example only, and not intended to limit the scope of the invention in any way. Those skilled in the art will recognize that other messages, commands or information transfer configurations may be used.

The scheduler 306 is an example of an element referred to more generally herein as "scheduling circuitry." In other embodiments, scheduling circuitry may include in addition to the scheduler 306 one or more of the time slot tables 308, one or more elements or functions of the transmit queue 302, or other arrangements of circuitry capable of implementing the scheduling techniques of the present invention. Thus, although shown as separate from the scheduler 306 in the figure, the time slot tables 308 or suitable portions thereof may be incorporated into scheduling circuitry in accordance with the invention.

The time slot tables 308 may be stored at least in part in the internal memory 104 of the network processor 102, and may also or alternatively be stored at least in part in the external memory 106 of the network processor 102.

A given one of the time slot tables 308 includes a plurality of locations, each corresponding generally to a transmission time slot. More particularly, each location in the table preferably corresponds to a single entry in memory which maps directly to a transmission time slot. Each of the locations is preferably configured for storing an identifier of one of the transmission elements from transmit queue 302 that has requested transmission of a block of data in the corresponding time slot. A time slot may be viewed as the amount of absolute time it takes to transmit a single block of data over interface or other network connection supported by the network processor 102. Each of the tables in the set of tables 308 may be associated with a particular interface or other network connection. It is to be appreciated that the invention does not require any particular size or configuration of data blocks.

The scheduler 306 provides dynamic maintenance of the time slot tables 308, such that identifiers of requesting transmission elements are entered into table locations on a demand basis. That is, as the transmission elements have data blocks to transmit, their identifiers are entered into the appropriate table locations. If a transmission element has no data block to transmit, then its identifier is not entered into the table.

FIG. 4 shows an example of one of the time slot tables 308. The table includes N+1 locations denoted Location 0, Location 1, . . . . Location N. Each of the locations is capable of storing an identifier of a transmission element. The state of the table represents the manner in which data blocks will be transmitted out over a particular interface or other network connection supported by the network processor 102. For example, assume that N=5, such that there are a total of six locations in the table, and that these six locations have entries as shown in the figure. An entry of "0" indicates that there is no transmission element identifier stored in the corresponding location. Locations 0, 2 and 4 each have the identifier of an Element #1 stored therein, while locations 1 and 3 have the identifiers of Element #2 and Element #3, respectively, stored therein.

As a result of this example storage of transmission element identifiers, Element #1 will receive exactly one-half of the bandwidth of the network connection with a delay variation of zero, while Element #2 and Element #3 will each receive one-sixth of the bandwidth of the network connection. It can therefore be seen that the manner in which the table is populated with transmission element identifiers will determine the transmission bandwidth assigned to each of the transmission elements. This assignment is made in accordance with one or more traffic shaping requirements established by the traffic shaping engine 304 and communicated to the scheduler 306 via the transmit queue 302.

The assignment of transmission element identifiers to table locations also determines the relative "clumping" or burstiness of the transmission elements, also referred to herein as delay variation. In the FIG. 4 example, each of Element #1, Element #2 and Element #3 will have a delay variation of zero.

In a demand-based scheduling arrangement such as that illustrated in conjunction with FIGS. 3 and 4, there may be collisions between transmission elements that request the same time slot for transmission. As indicated above, the present invention provides techniques for handling such collisions between requesting transmission elements.

In the illustrative embodiment of the invention, transmission element identifiers are preferably configured with a multi-bit structure for allowing a given one of the transmission element identifiers to be linked to another of the transmission element identifiers. For example, a portion of the given identifier may include a number of bits which uniquely specify another identifier to which the given identifier is linked. As a result, a linked list of such identifiers can be created. The invention in the illustrative embodiment utilizes this identifier linking mechanism to establish a linked list of transmission element identifiers that have requested the same time slot for transmission. Therefore, a given one of identifiers can be entered in the appropriate table location, with the other identifiers being linked to the entered identifier using the linking mechanism.

More particularly, in the event of a collision between multiple transmission elements requesting a given one of the time slots, an identifier of a first one of the requesting transmission elements is entered into the corresponding location in the time slot table, and that identifier is linked to an identifier of a second of the requesting transmission elements. Similar linking is provided between the identifier of the second requesting transmission element and an identifier of any subsequent one of the requesting transmission elements, so as to create a linked list of the multiple requesting elements for the corresponding location in the time slot table.

The transmission elements linked to a given element that has its identifier stored in a time slot table location may be referred to as being in a dynamic "waiting room," i.e., awaiting selection for transmission but not yet assigned to an actual transmission time slot in the table.

Upon transmission of a data block from one of the requesting transmission elements in the linked list of elements, a determination is made as to whether there are any further elements linked to that element. If there are any further elements, the identifier of the next such element is determined and that identifier is written into the corresponding location in the time slot table. This process continues until data blocks have been transmitted for all of the requesting elements. A set of pointers, to be described in conjunction with FIG. 5, is used to process the linked lists in a manner that maintains established traffic shaping requirements.

FIG. 5 shows the set of pointers used in the illustrative embodiment. These include a current pointer (CP) pointing to the next location in the time slot table for which a data block will be transmitted, an actual pointer (AP) pointing to the location in the time slot table corresponding to actual time, and a free pointer (FP) pointing to the next location in the time slot table that is a free entry with no requesting transmission element assigned thereto. It should be noted that each table in the set of time slot tables 308 will generally have its own set of pointers.

When the above-described linked list of identifiers is created in the event of a collision between multiple transmission elements requesting a given one of the time slots, the current pointer will continue to point to the corresponding location in the time slot table until each of the multiple requesting transmission elements has transmitted a data block. The actual pointer advances by one table location for each of the data blocks transmitted. The current pointer advances by one table location after each of the requesting transmission elements in the linked list associated with a given table location has transmitted a data block.

If the current pointer and the free pointer point to the same location in the time slot table and the actual pointer points to a different location in the time slot table, then the current pointer and the free pointer are both incremented to coincide with the actual pointer.

If the free pointer and the actual pointer point to different locations in the time slot table, and the actual pointer points to a location having a valid transmission element associated therewith, an identifier of that element is written to the location in the time slot table pointed to by the free pointer, the identifier of that element is deleted from the location in the time slot table pointed to by the actual pointer, and both the free pointer and the actual pointer are incremented by one.

A given requesting transmission element that has previously had a data block scheduled for transmission is subsequently assigned to a location in the time slot table for transmission of its next data block in accordance with the following equation:

$$\text{Assigned Time Slot} = AP - (FP - CP) + \text{Requested Time Slot Interval},$$

where the requested time slot interval is the time slot interval requested by the requesting transmission element, such that when the actual pointer, free pointer and current pointer each point to the same location in the time slot table, the assigned time slot corresponds to the requested time slot interval.

The above equation corresponds to a "rescheduling" of the transmission element, i.e., a scheduling of the next data block for transmission from the element subsequent to scheduling of its prior data block. In this rescheduling equation, the transmission element via the requested time slot interval indicates where it would like its next transmission to be scheduled given its previous transmission. For an initial scheduling for a given transmission element, the following equation may be used:

$$\text{Assigned Time Slot} = AP + \text{Requested Time Slot Interval}.$$

In this initial scheduling equation, the transmission element indicates via the requested time slot interval where it would like its initial transmission to be scheduled relative to actual time. The requested time slot interval in the above equations may be specified in terms of time slot units, e.g., 1 time slot unit, 2 time slot units, etc.

The above-described pointers are maintained by the scheduler 306 in controlling the time slot tables 308 in accordance with traffic shaping requirements established by the traffic shaping engine 304. The transmit queue 302 receives one or more traffic shaping requirements from the traffic shaping engine 304 and supplies scheduling and rescheduling requests to the scheduler 306 in accordance with the requirement(s). As indicated above, the table-based scheduling is implemented by the scheduler 306 in a manner that maintains the requirement(s) regardless of the collisions.

An example of the operation of the scheduler 306 utilizing a time slot table of the type shown in FIG. 4 and the set of pointers shown in FIG. 5 will now be described with reference to FIGS. 6 and 7.

Figure 6:
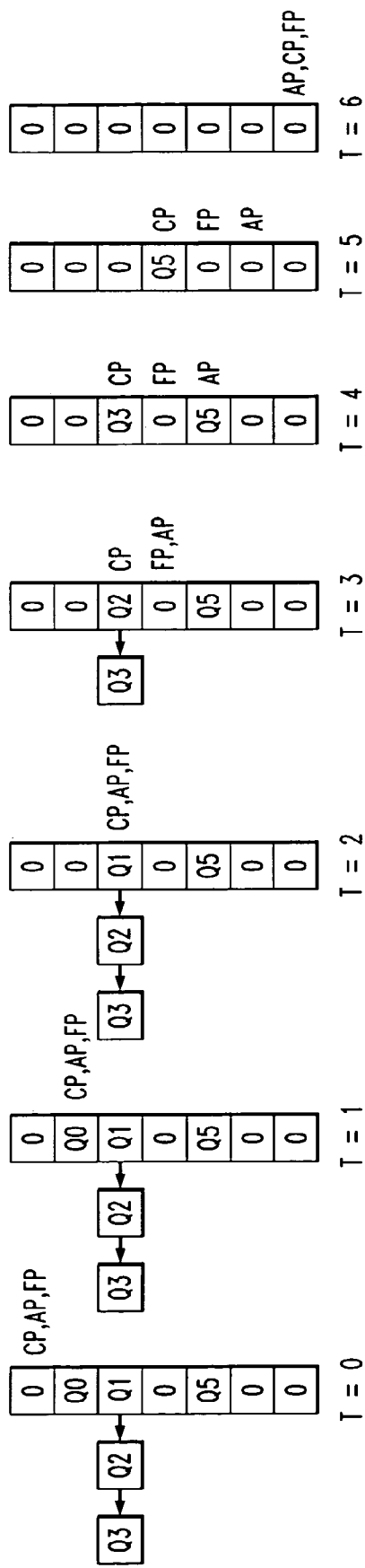
FIGS. 6 and 7 show examples of scheduling operations involving the FIG. 4 time slot table configuration and the FIG. 5 pointers in accordance with the techniques of the invention.

Referring initially to FIG. 6, the state of a time slot table having seven storage locations, each corresponding to a transmission time slot, is shown at each of seven different points in time denoted T=0, 1, 2, . . . 6. It should be understood that the particular number of table locations and time points shown is by way of example only.

At time T=0, transmission requests have been received from elements denoted Q0, Q1, Q2, Q3 and Q5. Element Q4 is not included because it is assumed for this example that no transmission request has been received from that element. Element Q0 has its identifier entered in the table location corresponding to the second time slot. As a result of a collision between requests from elements Q1, Q2 and Q3 for transmission in the third time slot, element Q1 has its identifier entered into the corresponding table location, and is linked to element Q2, with element Q2 being similarly linked to element Q3, using the above-described linking mechanism. More particularly, the element Q1 points to element Q2, and the element Q2 points to Q3. A linked list of elements Q1, Q2 and Q3 is therefore associated with the third time slot. Element Q5 has its identifier entered in the fifth time slot. The first, fourth, sixth and seventh time slots each have "0" entries at time T=0. CP, AP and FP are all aligned at the first time slot. Since CP is pointing to a time slot that has no transmission element associated therewith, no transmission is performed for this time slot.

At time T=1, CP, AP and FP have each advanced by one time slot to point to the second of the seven time slots. This second time slot has an element that is requesting transmission, that is, element Q0. Element Q0 is therefore selected for transmission of a data block in the second time slot.

At time T=2, CP, AP and FP have each advanced by one time slot to point to the third of the seven time slots. This third time slot has three elements that are requesting transmission, that is, elements Q1, Q2 and Q3. The table itself includes only the entry for element Q1, with Q2 and Q3 being linked to that entry in the manner previously described. Therefore, element Q1 is selected for transmission of a data block in the third time slot.

At time T=3, an identifier of element Q2 has been written into the table location previously occupied by the identifier of element Q1. Element Q2 is therefore selected for transmission of a data block in the fourth time slot. CP will not advance since there is still at least one element awaiting transmission in the corresponding third time slot. AP and FP each advance by one time slot as shown.

At time T=4, an identifier of element Q3 has been written into the table location previously occupied by the identifier of element Q2. Element Q3 is therefore selected for transmission of a data block in the fifth time slot. CP will not advance since there is still at least one element awaiting transmission in the corresponding third time slot. AP advances by one time slot. FP does not advance in this case, since FP points to the next time slot that has no element(s) assigned thereto, which is the fourth time slot in this example. It should be noted that FP points in this manner only after the pointers have "broken" with one another, that is, after CP separates from FP and AP.

At time T=5, there are no more elements assigned to the third time slot, so CP has advanced by one to point to the fourth time slot. Once FP and AP have separated, every time AP encounters a valid element in a time slot, then that element is written to the location pointed to by FP, deleted from the location pointed to by AP, and both FP and AP are incremented by one time slot. As a result, the element Q5 has been written to the fourth time slot, and will be the next element selected for transmission, i.e., in the sixth time slot.

At time T=6, there are no more elements requesting transmission. When CP becomes equal to FP after transmission from Q5 in the fourth time slot, then both CP and FP are incremented to AP to provide alignment of table entries with actual time. As a result, AP, CP and FP have again converged at the seventh time slot.

It can be shown that all time slots between FP and AP will be empty, which permits the above-described alignment with actual time. It can also be shown that if the average rates of all transmission elements are less than or equal to a scheduling rate out of the time slot table, then the pointers will always converge as described above. If this were not the case, then AP could attempt to increment past CP, resulting in a "table wrap" situation. In this situation, which is also known as dynamic table oversubscription, the elements have requested rates such that the sum of rates cannot be sustained by the interface or network connection through which the time slot table is scheduled.

Figure 7:
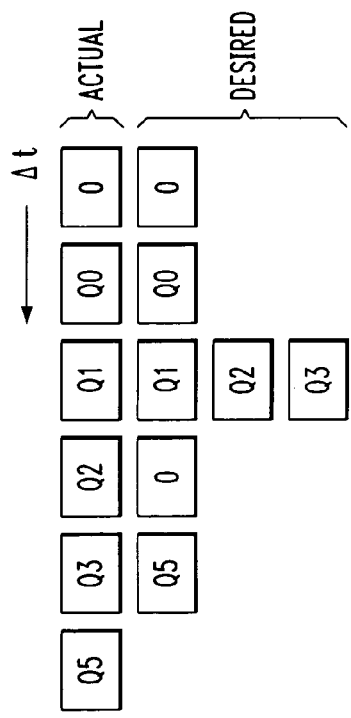

FIG. 7 shows the actual and desired orders of transmissions for the foregoing example. It can be seen that the worst case delay variation Δt in this example is two time slots. The desired order of transmission may be viewed as one possible example of an "established traffic shaping requirement" as this term is used herein. The described scheduling approach has substantially maintained the established traffic shaping requirement in the presence of the collisions. The term "substantially maintained" as used herein with reference to an established traffic shaping requirement is therefore intended to include any arrangement in which colliding transmission elements are linked from a single entry in the corresponding time slot table location, and then subsequently scheduled for transmission in the order in which they are linked.

In the above-described scheduling technique, as elements are deferred due to time slot table collisions, their transmission rates may decrease as the table attempts to converge around a "no collisions" state. It is expected that the transmission elements can accommodate any such a decrease as required through appropriate rate adjustment.

Also, it is apparent from the foregoing example that transmission elements may move within the time slot table. As described above, this occurs when AP has separated from FP, and AP encounters a valid element in its corresponding time slot. The following equation, which was also given previously and is repeated here for convenience, may be used for rescheduling an element in this situation:

$$\text{Assigned Time Slot} = AP - (FP - CP) + \text{Requested Time Slot Interval}.$$

It should be noted that the equation represents the latest time slot the element might have been in before it was moved. As such, the equation provides a pessimistic approximation, and a given element will therefore tend to be underutilized rather than overutilized. This may be important in certain applications, such as ATM networks, in which transmitting too fast can result in downstream discards because of policing. As indicated above, when the pointers are aligned, the right hand side of the equation reduces to the requested time slot interval. When the pointers are not aligned, the quantity FP−CP corresponds to the non-empty time slot table entries including those entries that have been compressed, and the quantity AP−(FP−CP) places the assigned time slot ahead of AP by the number of time slots containing valid elements. This equation also prevents scheduling into the FP−CP entries. This particular scheduling equation is not a requirement of the invention, and is instead offered by way of example. Those skilled in the art will recognize that other equations can be used, e.g., an equation corresponding to a less pessimistic approximation.

The above-described embodiments of the invention are intended to be illustrative only. For example, although the illustrative embodiment of FIG. 3 utilizes a scheduler which is separate from its associated time slot tables, these tables or portions thereof may be incorporated into scheduling circuitry in accordance with the invention. Similarly, although a separate transmit queue having multiple transmission elements is described in conjunction with the FIG. 3 embodiment, the associated functionality may be distributed across scheduling circuitry and traffic shaping circuitry in accordance with the invention. Other embodiments can use different types and arrangements of processing elements for implementing the described functionality. These and numerous other alternative embodiments within the scope of the following claims will be apparent to those skilled in the art.

What is claimed is:

1. A processor comprising:
   scheduling circuitry for scheduling data blocks for transmission from a plurality of transmission elements; and
   traffic shaping circuitry coupled to the scheduling circuitry and operative to establish a traffic shaping requirement for the transmission of the data blocks from the transmission elements;
   wherein the scheduling circuitry is configured for utilization of at least one time slot table, the time slot table comprising a plurality of locations, each of the locations corresponding to a transmission time slot and being configured to store at least one entry, the scheduling circuitry being operative in conjunction with the time slot table to schedule the data blocks for transmission in a manner that substantially maintains the traffic shaping requirement established by the traffic shaping circuitry in the presence of collisions between requests from the transmission elements for each of one or more of the time slots, through the use of a linking of colliding transmission elements and by moving at least one entry from a first location within the at least one time slot table to a second location within the at least one time slot table.

2. The processor of claim 1 wherein the time slot table is stored at least in part in an internal memory of the processor.

3. of claim 1 wherein the time slot table is stored at least in part in an external memory coupled to the processor.

4. The processor of claim 1 wherein a given one of the locations in the time slot table stores an identifier of one of the transmission elements that has requested transmission of a block of data in the corresponding time slot.

5. The processor of claim 1 wherein one or more of the data blocks comprise data packets.

6. The processor of claim 1 wherein the established traffic shaping requirement is substantially maintained by linking together identifiers of transmission elements generating requests that collide for a given time slot, from a single entry in the corresponding table location, and then scheduling the requesting elements for transmission in the order in which they are linked.

7. The processor of claim 1 wherein the scheduling circuitry provides dynamic maintenance of the time slot table such that identifiers of requesting transmission elements are entered into the table locations on a demand basis.

8. The processor of claim 1 wherein identifiers of the transmission elements comprise a structure for allowing a given one of the transmission element identifiers to be linked to another of the transmission element identifiers.

9. The processor of claim 8 wherein in the event of a collision between multiple transmission elements requesting a given one of the time slots, an identifier of a first one of the requesting transmission elements is entered into the corresponding location in the time slot table, and that identifier is linked to an identifier of a second of the requesting transmission elements, with similar linking between the identifier of the second requesting transmission element and an identifier of any subsequent one of the requesting transmission elements, a linked list of the multiple requesting elements thereby being created for the corresponding location in the time slot table.

10. The processor of claim 9 wherein upon transmission of a data block from one of the requesting transmission elements in the linked list of elements, a determination is made as to whether there are any further elements linked to that element, and if there are any further elements, the identifier of the next such element is determined and that identifier is written into the corresponding location in the time slot table.

11. The processor of claim 1 further comprising a transmit queue coupled to the scheduling circuitry and the traffic shaping circuitry, the transmit queue supplying time slot requests from transmission elements to the scheduling circuitry in accordance with the traffic shaping requirement established by the traffic shaping circuitry.

12. The processor of claim 1 wherein the processor comprises a network processor configured to provide an interface for data block transfer between a network and a switch fabric.

13. The processor of claim 1 wherein the processor is configured as an integrated circuit.

14. A processor comprising:
scheduling circuitry for scheduling data blocks for transmission from a plurality of transmission elements; and
traffic shaping circuitry coupled to the scheduling circuitry and operative to establish a traffic shaping requirement for the transmission of the data blocks from the transmission elements;
wherein the scheduling circuitry is configured for utilization of at least one time slot table, the time slot table comprising a plurality of locations, each of the locations corresponding to a transmission time slot and being configured to store at least one entry, the scheduling circuitry being operative in conjunction with the time slot table to schedule the data blocks for transmission in a manner that substantially maintains the traffic shaping requirement established by the traffic shaping circuitry in the presence of collisions between request from the transmission elements for each of one or more of the time slots, through the use of a linking of colliding transmission elements and by moving at least one entry from a first location within the at least one time slot table to a second location within the at least one time slot table; and
wherein the scheduling circuitry maintains a set of pointers for the time slot table, the set of pointers comprising one or more of:
a current pointer pointing to the next location in the time slot table for which a data block will be transmitted;
an actual pointer pointing to the location in the time slot table corresponding to actual time; and
a free pointer pointing to the next location in the time slot table that is a free entry with no requesting transmission element assigned thereto.

15. The processor of claim 14 wherein in the event of a collision between multiple transmission elements requesting a given one of the time slots, a linked list of identifiers of the multiple requesting elements is created, and the current pointer continues to point to the corresponding location in the time slot table until each of the multiple requesting transmission elements has transmitted a data block.

16. The processor of claim 15 wherein the actual pointer advances by one table location for each of the data blocks transmitted.

17. The processor of claim 15 wherein the current pointer advances by one table location after each of the requesting transmission elements in the linked list associated with a given table location has transmitted a data block.

18. The processor of claim 15 wherein if the current pointer and the free pointer point to the same location in the time slot table and the actual pointer points to a different location in the time slot table, then the current pointer and the free pointer are both incremented to coincide with the actual pointer.

19. A processor comprising:
scheduling circuitry for scheduling data blocks for transmission from a plurality of transmission elements; and
traffic shaping circuitry coupled to the scheduling circuitry and operative to establish a traffic shaping requirement for the transmission of the data blocks from the transmission elements;
wherein the scheduling circuitry is configured for utilization of at least one time slot table, the time slot table comprising a plurality of locations, each of the locations corresponding to a transmission time slot, the scheduling circuitry being operative in conjunction with the time slot table to schedule the data blocks for transmission in a manner that substantially maintains the traffic shaping requirement established by the traffic shaping circuitry in the presence of collisions between requests from the transmission elements for each of one or more of the time slots, through the use of a linking of colliding transmission elements; and wherein the scheduling circuitry maintains a set of pointers for the time slot table, the set of pointers comprising one or more of:

an actual pointer pointing to the location in the time slot table corresponding to actual time; and a free pointer pointing to the next location in the time slot table that is a free entry with no requesting transmission element assigned thereto; and wherein if the free pointer and the actual pointer point to different locations in the time slot table, and the actual pointer points to a location having a valid transmission element associated therewith, an identifier of that element is written to the location in the time slot table pointed to by the free pointer, and the identifier of that element is deleted from the location in the time slot table pointed to by the actual pointer, and both the free pointer and the actual pointer are incremented by one.

20. A processor comprising:

scheduling circuitry for scheduling data blocks for transmission from a plurality of transmission elements; and traffic shaping circuitry coupled to the scheduling circuitry and operative to establish a traffic shaping requirement for the transmission of the data blocks from the transmission elements;

wherein the scheduling circuitry is configured for utilization of at least one time slot table, the time slot table comprising a plurality of locations, each of the locations corresponding to a transmission time slot, the scheduling circuitry being operative in conjunction with the time slot table to schedule the data blocks for transmission in a manner that substantially maintains the traffic shaping requirement established by the traffic shaping circuitry in the presence of collisions between requests from the transmission elements for each of one or more of the time slots, through the use of a linking of colliding transmission elements; and wherein the scheduling circuitry maintains a set of pointers for the time slot table, the set of pointers comprising one or more of:

a current pointer pointing to the next location in the time slot table for which a data block will be transmitted;

an actual pointer pointing to the location in the time slot table corresponding to actual time; and a free pointer pointing to the next location in the time slot table that is a free entry with no requesting transmission element assigned thereto; and wherein a given requesting transmission element is assigned to a location in the time slot table in accordance with the following equation:

Assigned Time Slot =AP- (FP-CP) +Requested Time Slot Interval, where AP denotes the actual pointer, FP denotes the free pointer, CP denotes the current pointer, and the requested time slot interval is the time slot interval requested by the requesting transmission element, such that when the actual pointer, free pointer and current pointer each point to the same location in the time slot table, the assigned time slot corresponds to the requested time slot interval.

21. A method for use in a processor for scheduling data blocks for transmission from a plurality of transmission elements, the method comprising:

establishing a traffic shaping requirement for the transmission of the data blocks from the transmission elements; and scheduling the data blocks for transmission in a manner that substantially maintains the traffic shaping requirement in the presence of collisions between requests from the transmission elements for each of one or more transmission time slots, utilizing at least one time slot table, the time slot table comprising a plurality of locations, each of the locations corresponding to one of the transmission time slots and being configured to store at least one entry, and further utilizing a linking of colliding transmission elements and movement of at least one entry from a first location within the at least one time slot table to a second location within the at least one time slot table.

22. A computer-readable medium comprising one or more software programs for use in scheduling data blocks for transmission from a plurality of transmission elements, utilizing at least one time slot table, the time slot table comprising a plurality of locations, each of the locations corresponding to a transmission time slot and being configured to store at least one entry, wherein the one or more programs when executed implement the steps of:

establishing a traffic shaping requirement for the transmission of the data blocks from the transmission elements; and scheduling the data blocks for transmission in a manner that substantially maintains the traffic shaping requirement in the presence of collisions between requests from the transmission elements for each of one or more of the transmission time slots, through the use of a linking of colliding transmission elements and by moving at least one entry from a first location within the at least one time slot table to a second location within the at least one time slot table.

* * * * *